Nov. 25, 1958   G. A. TINNERMAN   2,861,618
FASTENING DEVICE WITH INDEPENDENT PRE-HARDENED
THRUST RESISTANT WIRE CLIPS
Filed Feb. 3, 1955
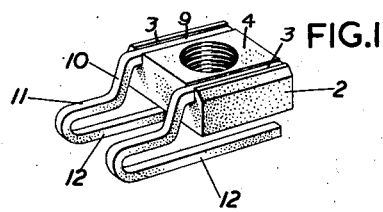
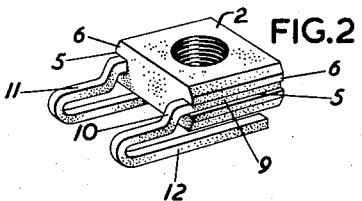
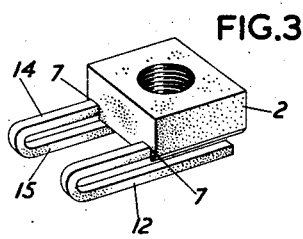
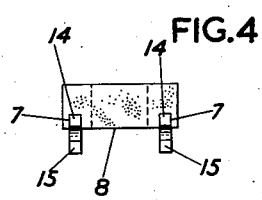
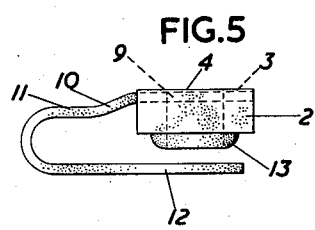
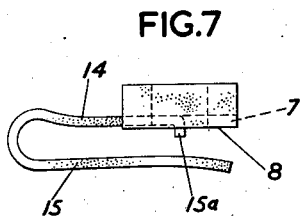
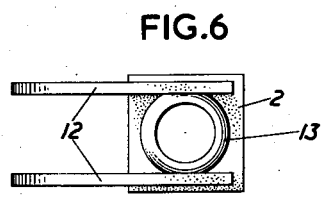
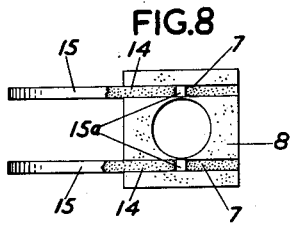
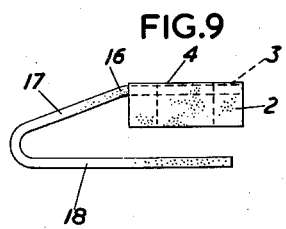
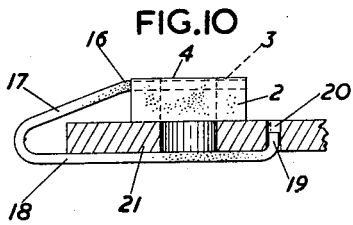
Inventor
GEORGE A. TINNERMAN.
By- Featherstonhaugh & Co.
Atty's

United States Patent Office 2,861,618
Patented Nov. 25, 1958

2,861,618

FASTENING DEVICE WITH INDEPENDENT PRE-HARDENED THRUST RESISTANT WIRE CLIPS

George A. Tinnerman, Lakewood, Ohio

Application February 3, 1955, Serial No. 485,869

4 Claims. (Cl. 151—41.75)

This invention relates to fastening devices and in particular to a device for retaining a nut firmly in position for the reception of a bolt threaded thereinto. In assembly work there are often many instances, especially in blind locations, where it is very difficult for the operator to hold a nut while the bolt is being inserted and thereafter hold the nut against rotation when the bolt is being tightened.

The object of the invention is to provide a fastener which may be readily clipped or fastened to one of the parts to be joined by a bolt and which is formed to anchor a nut firmly in position for the reception of a bolt. The fastener may be one of several forms, but in each case comprises a pair of substantially U-shaped clips in the form of wires or strips, each having a leg attached to a nut on either side of its hole; the other legs being arranged to frictionally engage the back face of the part to which the nut is attached.

The several forms of the invention are illustrated in the accompanying drawing, in which:

Fig. 1 is a perspective view of a nut showing the nut engaging legs of the clips contained within slots in the outer face of the nut.

Figs. 2 and 3 are similar views to Fig. 1, and showing the nut engaging legs of the clips contained within slots in the sides and inner face of the nut respectively.

Fig. 4 is an end view of the arrangement shown in Fig. 3.

Fig. 5 is a side view of an assembly similar to that shown in Fig. 1, and wherein the inner face of the nut is formed with a ring boss surrounding the nut hole and adapted to be seated within the bolt hole or a counter-sunk portion thereof in the part to which the nut is anchored.

Fig. 6 is an inverted plan view of the assembly shown in Fig. 5.

Fig. 7 is a side view of an assembly wherein the clip legs are contained within slots in the inner face of the nut with their ends turned outwardly on either side of the nut hole and adapted to be seated within the bolt hole or a counter-sunk portion thereof in the part to which the nut is anchored.

Fig. 8 is an inverted plan view of the assembly shown in Fig. 7; and

Figs. 9 and 10 are side views of the outer face slotted form of nut as shown in Fig. 1, and showing two modifications of the leg shapes of the clips, the nut in Fig. 10 being shown fastened to a part which is in section.

The pairs of clips forming the fasteners are attached to the nuts 2 by positioning one leg of each clip within one of a pair of similarly positioned slots formed in one of the nut faces.

The nut shown in Figs. 1, 5, 6, 9 and 10 is formed with a pair of clip receiving slots 3 extending across its outer face 4 on either side of the hole. Fig. 2 illustrates a nut wherein clip receiving slots 5 are formed within opposite sides 6 of the nut; and Figs. 3, 4, 7 and 8 illustrate a nut having its clip receiving slots 7 extending across the inner face 8 of the nut on either side of the hole.

The clips, as shown in the drawing, are formed of wire or strips of square cross section and dimensioned to be tightly received within the nut slots which are of a corresponding cross sectional shape, the clip legs being secured within the slots in any suitable manner, such as by staking or spot welding. While it is preferable that the wire or strip be of standard square cross section, it is not necessary to the invention that this particular shape be used.

The clips shown in Figs. 1, 2 and 5 are of similar form, and wherein the legs of the clips which are attached to the nuts each comprise a straight portion 9 contained within a nut slot and a downwardly bent portion 10 merging into a second straight portion 11 substantially parallel to the portion 9. In these clip forms the lower part engaging legs 12 of the clips are substantially straight.

Figs. 5 and 6 illustrate a nut having a ring boss 13 formed upon its inner face and which surrounds the nut hole. The boss is provided to be seated within the bolt hole or a counter-sunk portion thereof in the part to which the nut is to be fastened and whereby the nut hole is retained in alignment with the bolt hole.

Figs. 3, 4, 7 and 8 illustrate clips wherein their pairs of legs 14 and 15 are substantially straight and parallel, the legs 14 being contained within the slots 7 in the inner faces of the nuts. In the arrangement shown in Fig. 8, the legs 14 extend only to the central portion of the inner face of the nut and are formed at their ends with outwardly turned prongs 15a which are arranged to be seated within the bolt hole or counter-sink in the part to which the nut is to be fastened and serve to retain the nut hole in alignment with the bolt hole.

In the clip form shown in Figs. 9 and 10, wherein the legs 16 of the clips are attached to the outer faces of the nuts, such legs comprise straight portions contained within the nut slots 3 and inclined portions 17 extending downwardly from such straight portions. The lower legs 18 are straight, and in the arrangement shown in Fig. 10 the legs 18 extend beyond the edge of the inner face of the nut and are formed upon their ends with outturned prongs 19, such prongs being provided to be seated within suitably positioned nut aligning holes 20 in the part 21 to which the nut is to be fastened.

In all forms it will be noted that those legs of the clips which are not secured to the nut are disposed in spaced relation to one of the two major surfaces of the nut, i. e. the bottom of the nut. These legs in all cases are disposed in substantially spaced parallel relation to said surface and are capable of clamping the nut or nut-like element stably on a supporting member in registry with an orifice for reception of a stud, such as a bolt or the like, to be received and secured in the bore of the nut-like element.

To position one of the nuts in place in alignment with a bolt hole, the U-shaped fastener clips are slipped over the edge of the part to which the nut is to be fastened, the inner face of the nut engaging one face of the part and the free legs of the clip the other face of the part, as shown in Fig. 10; it being understood that the clip legs have sufficient spring to ensure a tight grip upon the part. It will also be appreciated that with the exception of the arrangement shown in Fig. 10 that the nuts may be fastened in place upon a part without the necessity of incorporating any additional nut fastening means in the part, such as the prong receiving holes 20 in the part 21 in Fig. 10. It will also be further understood that the clips are of leg lengths proportionate to the distance of the bolt holes from the edge of the part.

To provide a maximum nut fastening grip upon the part to which the nut is attached and to prevent the nut shifting to any degree as its bolt is being tightened, the clips are attached to the nuts in planes which are substantially parallel to the axis of the nut hole, as clearly shown in Fig. 4; the square cross sectional wires and wire receiving nut slots being very effective in obtaining this objective as the square arrangement retains the clips from twisting.

What I claim as my invention is:

1. An assembly comprising a nut-like element having a stud receiving bore intersecting major surfaces thereof, and a pair of independent wire clips for holding said nut-like element in stud receiving position on a plate-like supporting member having a stud receiving passage to be aligned with said bore, said wire clips each formed from a single piece of pre-hardened wire bent upon itself to substantially U-shaped formation to provide a pair of thrust resisting legs in co-extending spaced apart relation to one another and terminating in free, axially co-extensive, clamping ends, one leg of each clip being permanently secured adjacent to its free end to said element from a surface thereof, said clips being disposed on opposite sides of said bore, each clip being disposed in a single plane which is substantially parallel to the axis of said bore and said clips being substantially parallel to one another and disposed within the confines of the major dimension of the face of the nut, the other legs of said clips being disposed in spaced apart relation to one of said major surfaces of said element, said legs forming therebetween a receiving space to enable the legs to be disposed over an edge of said plate-like supporting element to extend on opposite sides of said supporting member, means interacting between said assembly and the plate-like supporting member for maintaining registry between said nut-like element and said stud receiving passage, whereby said assembly may be clamped on said supporting member in registry with said stud passage and when clamped is resistant to deformation occasioned by the thrust of a stud projected through said passage for engagement with said element under any force which may be applied thereagainst during assembly, and heat treating of the assembly is avoided.

2. An assembly as defined in claim 1, wherein said means includes a ring boss formed upon the inner face of said nut-like element surrounding the bore therein and adapted to be seated in the stud receiving passage in said plate-like member.

3. An assembly as defined in claim 1 wherein said means includes at least one projection on said assembly adapted to be inserted in a hole in said plate-like supporting member said hole being spaced from the stud receiving passage therein.

4. An assembly as defined in claim 1 wherein the legs of the clips which are secured to the nut-like element are disposed between the major surfaces of said nut-like element.

References Cited in the file of this patent

UNITED STATES PATENTS

| | | |
|---|---|---|
| 1,114,013 | Millar | Oct. 20, 1914 |
| 2,159,573 | Tinnerman | May 23, 1939 |
| 2,266,832 | Tinnerman | Dec. 23, 1941 |
| 2,323,689 | Tinnerman | July 6, 1943 |
| 2,558,720 | Hansman | July 3, 1951 |
| 2,772,560 | Neptune | Dec. 4, 1956 |